US012179380B2

(12) United States Patent
Choi et al.

(10) Patent No.: US 12,179,380 B2
(45) Date of Patent: Dec. 31, 2024

(54) PRESS APPARATUS FOR VEHICLE CRASH PADS COMPRISING REAL WOOD SHEETS

(71) Applicants: HYUNDAI MOBIS Co., Ltd., Seoul (KR); SEOYON AUTOVISION Co., Ltd., Dangjin-si (KR)

(72) Inventors: Ik Keun Choi, Yongin-si (KR); Min Kyeong Lee, Yongin-si (KR); Hyun Ho Lee, Gunpo-si (KR); Ji Seung Hong, Hwaseong-si (KR); Jong Jin Lee, Incheon (KR)

(73) Assignees: Hyundai Mobis Co., Ltd., Seoul (KR); Seoyon Autovision Co., Ltd., Dangjin-si (KR)

( * ) Notice: Subject to any disclaimer, the term of this patent is extended or adjusted under 35 U.S.C. 154(b) by 0 days.

(21) Appl. No.: 17/840,943

(22) Filed: Jun. 15, 2022

(65) Prior Publication Data

US 2023/0044292 A1 Feb. 9, 2023

(30) Foreign Application Priority Data

Aug. 4, 2021 (KR) ........................ 10-2021-0102380

(51) Int. Cl.
*B27N 3/20* (2006.01)

(52) U.S. Cl.
CPC ...................................... *B27N 3/20* (2013.01)

(58) Field of Classification Search
CPC .................................. B27M 1/02; B27N 3/20
See application file for complete search history.

(56) References Cited

U.S. PATENT DOCUMENTS

| | | | | |
|---|---|---|---|---|
| 3,604,483 A * | 9/1971 | Nissen | E04G 21/30 | 144/135.3 |
| 5,028,374 A * | 7/1991 | Imao | B27N 5/00 | 264/517 |
| 5,247,975 A * | 9/1993 | Tanahashi | B27M 1/02 | 144/380 |
| 5,346,574 A * | 9/1994 | Tamura | B32B 9/045 | 144/333 |
| 5,979,038 A * | 11/1999 | Nelson | B23Q 3/002 | 29/33 P |
| 6,196,283 B1 * | 3/2001 | Hundegger | B23D 47/045 | 409/215 |

(Continued)

FOREIGN PATENT DOCUMENTS

KR 10-2020-0042116 A 4/2020

*Primary Examiner* — Andrew D Graham
(74) *Attorney, Agent, or Firm* — NSIP Law

(57) ABSTRACT

A press apparatus for vehicle crash pads including real wood sheets. The press apparatus includes a lower press including an engraved part, and a support part to support an upper press, the support part having a fixing protrusion, the upper press including an embossed part, first slides fixed to maintain a shape of the engraved part during a compression process of the real wood sheet, the first slides compressing a rear surface of the real wood sheet while rising along the embossed part, and a second slide to compress the real wood sheet during the compression process of the real wood sheet. During a wrapping process of the real wood sheet, the second slide compresses the real wood sheet to an inner rear surface of a core while falling such that a portion of the real wood sheet bent inward of the engraved part is wound around the core.

7 Claims, 15 Drawing Sheets

(56) References Cited

U.S. PATENT DOCUMENTS

| | | | | |
|---|---|---|---|---|
| 9,962,894 | B1* | 5/2018 | McDonald | B27N 3/18 |
| 2006/0236650 | A1* | 10/2006 | Suzuki | B27M 1/02 52/749.1 |
| 2006/0261519 | A1* | 11/2006 | Suzuki | B27M 1/02 264/320 |
| 2009/0126829 | A1* | 5/2009 | Suzuki | B27M 1/02 144/381 |
| 2009/0130241 | A1* | 5/2009 | Suzuki | B27M 3/34 425/112 |
| 2009/0139635 | A1* | 6/2009 | Suzuki | B27M 1/02 156/182 |
| 2009/0165961 | A1* | 7/2009 | Sanchez | B27N 3/08 156/581 |
| 2010/0236665 | A1* | 9/2010 | Suzuki | B27M 1/02 144/380 |
| 2010/0255331 | A1* | 10/2010 | Suzuki | B44C 3/087 428/535 |
| 2012/0018046 | A1* | 1/2012 | Suzuki | B27M 1/02 144/380 |
| 2012/0018047 | A1* | 1/2012 | Suzuki | B27M 1/02 144/380 |
| 2012/0022677 | A1* | 1/2012 | Suzuki | B27M 1/02 700/98 |
| 2013/0243983 | A1* | 9/2013 | Omote | B32B 21/042 156/224 |
| 2015/0101509 | A1* | 4/2015 | McIntyre | B27N 3/18 264/119 |
| 2016/0032533 | A1* | 2/2016 | Ohnishi | C08G 18/6229 428/201 |
| 2018/0126511 | A1* | 5/2018 | Dawidziak | B24B 9/18 |
| 2019/0283269 | A1* | 9/2019 | Wilson | B27N 3/143 |
| 2020/0139576 | A1* | 5/2020 | Li | B27N 3/002 |
| 2023/0038216 | A1* | 2/2023 | Choi | B32B 21/10 |
| 2023/0043256 | A1* | 2/2023 | Choi | B32B 27/065 |
| 2023/0044171 | A1* | 2/2023 | Choi | B27D 1/08 |
| 2023/0044292 | A1* | 2/2023 | Choi | B27D 1/083 |

* cited by examiner

PRESS APPARATUS FOR VEHICLE CRASH PADS COMPRISING REAL WOOD SHEETS

CROSS-REFERENCE TO RELATED APPLICATIONS

This application claims the benefit under 35 USC § 119(a) of Korean Patent Application No. 10-2021-0102380, filed on Aug. 4, 2021 in the Korean Intellectual Property Office, the entire disclosure of which is incorporated herein by reference for all purposes.

BACKGROUND

1. Technical Field

The present disclosure relates to a real wood skin capable of automatic wrapping, and a process and apparatus for manufacturing the same.

2. Related Art

A conventional real wood skin used for vehicles is produced by preforming a real wood sheet on decorative veneer wood, performing insert injection (rear injection) molding on the preformed real wood sheet, trimming the end of the injected real wood sheet, and then curling and coating the trimmed real wood sheet in this order.

Such a conventional real wood skin product may provide a real wood surface with excellent visual and tactile sense due to rear injection molding applied thereto, but feels cheep when pressed by consumers since it comprises high-hardness real wood attached on the injected surface thereof.

Of course, some customers may assume that the skin product is hard due to high-hardness real wood. However, this product may not satisfy customers who want the interior material thereof to be soft.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Various embodiments are provided to use a side slide core for implementation of undercuts, to improve adhesion between a real wood sheet and a core, and to use a rear slide core for implementation of automatic wrapping of the real wood sheet and thus process automation.

Various embodiments are also directed to a press apparatus for vehicle crash pads comprising real wood sheets that can provide elasticity while giving a visual impression like real wood.

The present disclosure is not limited to the above-mentioned objects, and other objects of the present disclosure can be clearly understood by those skilled in the art to which the present disclosure pertains from the following description.

In one general aspect, a press apparatus for vehicle crash pads including real wood sheets includes a lower press including an engraved part disposed in an area where a product is to be formed, and a support part configured to support an upper press when compressed to the upper press, the support part having a fixing protrusion for fixing a real wood sheet, the upper press including an embossed part corresponding to the engraved part of the lower press, a plurality of first slides fixed to maintain a shape of the engraved part of the lower press during a compression process of the real wood sheet, the first slides being configured, after the compression process of the real wood sheet, to compress a rear surface of the real wood sheet while rising along the embossed part of the upper press and then to move laterally, and a second slide configured to compress the real wood sheet located on the engraved part together with the embossed part of the upper press during the compression process of the real wood sheet, wherein, during a wrapping process of the real wood sheet, the rear surface of the real wood sheet is compressed by the first slides after the second slide rises together with the upper press, and the second slide is configured to compress the real wood sheet to an inner rear surface of a core while falling such that a portion of the real wood sheet bent inward of the engraved part is wound around the core.

The support part may have a fixing pin for fixing the real wood sheet.

The plurality of first slides may be configured to be moved and fixed to maintain the shape of the engraved part of the lower press during the compression process of the real wood sheet to form the engraved part.

After the compression process of the real wood sheet, the first slides may compress the rear surface of the real wood sheet to the core while rising along the embossed part of the upper press, and then move laterally. The second slide may be disposed in the upper press to compress the real wood sheet located on the engraved part together with the embossed part of the upper press during the compression process of the real wood sheet.

During the wrapping process of the real wood sheet, the rear surface of the real wood sheet may be compressed by the first slides after the second slide rises together with the upper press. The second slide may be configured to compress the real wood sheet to the inner rear surface of the core while falling such that the portion of the real wood sheet bent inward of the engraved part is wound around the core.

The press apparatus may further include a plurality of third slides fixed to maintain the shape of the engraved part of the lower press during the compression process of the real wood sheet, wherein after the compression process of the real wood sheet, the third slides may compress the rear surface of the real wood sheet while rising along the embossed part of the upper press, and then move laterally to remove a remaining portion of the real wood sheet.

The real wood sheet may be a real wood sheet preformed by a preforming process.

The real wood sheet may include a real wood sheet body formed to have the same shape as a real wood product, a plurality of wood sheet compression fixing ribs formed on the outside of the real wood sheet body to fix the real wood sheet, each of the wood sheet compression fixing ribs having a first fixing hole for fixing the real wood sheet to a press during the preforming process, and a wrapping fixing rib formed on the outside of the real wood sheet body to fix the real wood sheet, the wrapping fixing rib having a second fixing hole formed by a hole processing pin of a preforming press during the preforming to fix the real wood sheet to a pin of a press molding machine.

In another general aspect, a method of pressing vehicle crash pads including real wood sheets includes seating a preformed real wood sheet on a lower press, bonding a core to an upper press and then compressing the upper press to the lower press, raising a first slide along a rear surface of the real wood sheet together with the upper press, and compressing the real wood sheet located on an engraved part of the lower press to the inside of the core while lowering a second slide provided in the upper press.

In another general aspect, a method of pressing vehicle crash pads including real wood sheets includes fixing a third slide to maintain a shape of an engraved part of a lower press during a compression process of a real wood sheet, compressing a rear surface of the real wood sheet while rising along an embossed part of an upper press after the compression process of the real wood sheet, and moving the third slide to a side of the real wood sheet to cut a portion of the real wood sheet deviating from a core.

Other features and aspects will be apparent from the following detailed description, the drawings, and the claims.

DETAILED DESCRIPTION

Advantages and features of the present disclosure and methods of achieving them will become apparent with reference to the embodiments described below in detail in conjunction with the accompanying drawings. The present disclosure may, however, be embodied in different forms, and should not be construed as being limited to the embodiments set forth herein. Rather, these embodiments are provided so that the disclosure will be thorough and complete, and will fully convey the scope of the present disclosure to those skilled in the art. The present disclosure should be defined based on the entire content set forth in the appended claims. Meanwhile, the terms used herein are for the purpose of describing the embodiments and are not intended to limit the disclosure. As used herein, the singular forms "a", "an" and "the" are intended to include the plural forms as well, unless context clearly indicates otherwise. It will be understood that the terms "comprises"/"includes" and/or "comprising"/"including" when used in the specification, specify the presence of stated components, steps, motions, and/or elements, but do not preclude the presence or addition of one or more other components, steps, motions, and/or elements.

Figure 1:
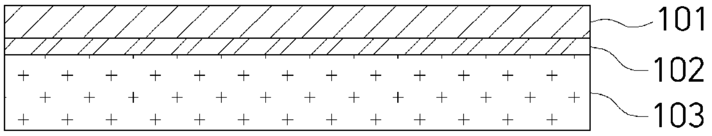
FIG. 1 is a reference view for explaining a real wood skin capable of automatic wrapping according to an first embodiment the present disclosure.

FIG. 1 is a reference view for explaining a real wood skin capable of automatic wrapping according to the present disclosure.

As illustrated in FIG. 1, the real wood skin capable of automatic wrapping according to the first embodiment of the present disclosure includes a wood layer 101, a mesh layer 102, and an elastic layer 103.

The wood layer 101 is a layer that gives the same visual impression as wood material. The wood layer 101 preferably has a thickness of 0.1 t to 0.2 t, and may have wood grain formed by a sanding machine.

The mesh layer 102 is a layer that is laminated under the wood layer 101 to reinforce the sheet. It is preferable that the mesh layer 102 have a thickness of 0.2 t.

The elastic layer 103 is a layer that is laminated under the mesh layer 102 to provide elasticity. The elastic layer 103 may be formed of polypropylene (PP) foam or thermoplastic polyolefin (TPO) foam. It is preferable that the elastic layer 103 have a thickness of 1 t to 2 t.

According to the first embodiment of the present disclosure, the real wood skin may further include a protective film 104 laminated on the wood layer 101 to protect the wood layer. It is preferable that the protective film 104 have a thickness of 0.1 t.

FIGS. 2A, 2B, 2C, 2D, and 2E are reference views for explaining a process of manufacturing a real wood sheet according to the first embodiment of the present disclosure.

Figure 2A:
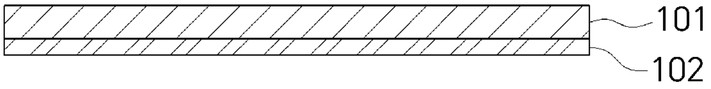
FIGS. 2A, 2B, 2C, 2D, and 2E are reference views for explaining a process of manufacturing vehicle crash pads comprising real wood sheets according to the first embodiment of the present disclosure.
Figure 2B:
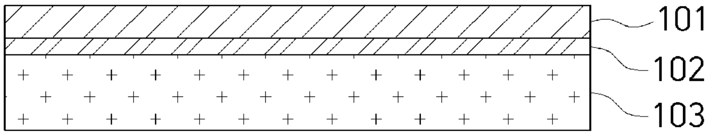
Figure 2C:
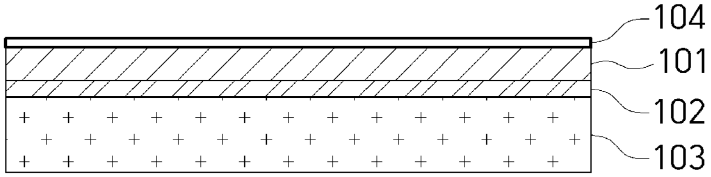

In the real wood sheet of the first embodiment of the present disclosure, the mash layer 102 is laminated under the wood layer 101 as illustrated in FIG. 2A, and the elastic layer 103 is then laminated under the mash layer 102 as illustrated in FIG. 2B. As illustrated in FIG. 2C, the protective film 104 may be laminated on the wood layer 101 to protect the wood layer 101.

Figure 2D:
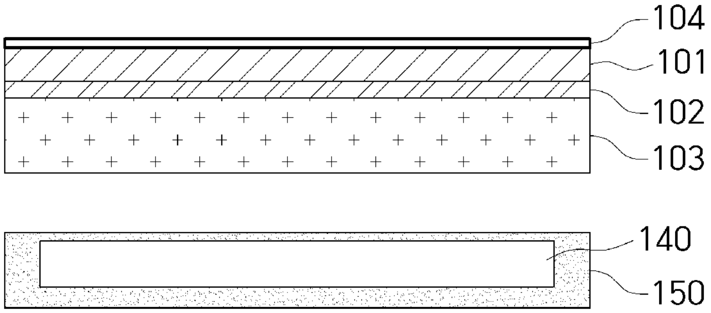
Figure 2E:
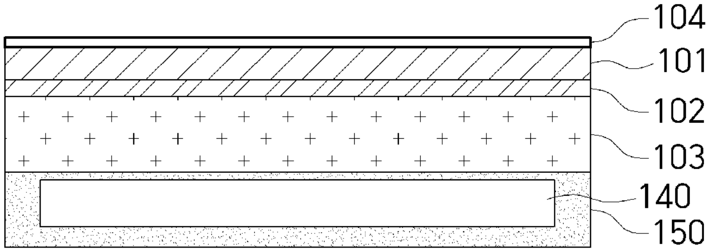

As illustrated in FIG. 2D, the real wood sheet 100 further includes a filament cross pad 140 and a core 150 provided at the bottom thereof. The filament cross pad 140 is provided in a partial area of a vehicle desk to allow that area to be cushioned.

As such, it is preferable that the filament cross pad 140 provided in one area of the desk be laminated under the elastic layer 103. It is preferable that the filament cross pad 140 have a thickness of 2 to 5 t, and be applied to an entire area of 3 mm or less from the injected end of the real wood sheet, which is touched by a hand. The filament cross pad 140 may be made of, but not limited to, PP or TPO material.

The core 150 is mounted on the vehicle desk, and preferably has a thickness of 0.3 t.

After performing a bonding operation of applying a glue following a primer to the core 150, the filament cross pad 140 is attached on the core 150. In this case, this may be made using a membrane or by press compression. After an additional bonding operation of applying a glue to the top of the filament cross pad 140 is performed, the wood layer 101, the mesh layer 102, the elastic layer 103, the filament cross pad 140, and the protective film are compressed with a compression jig.

As such, according to the embodiment of the present disclosure, it is possible to make the real wood sheet 100, constituting the vehicle desk, feel the same as real wood, and to provide a certain degree of cushioning when the real wood sheet is touched by an occupant.

In the conventional case of manufacturing a real wood sheet through injection molding, it is impossible to implement the effect of the present disclosure. However, according to the first embodiment of the present disclosure, it is possible to supplement the elongation of the real wood sheet and improve the surface quality of the real wood sheet by applying PP foam/TPO foam to the rear surface of the wood, and to make a real wood wrapping product to be soft by applying the filament cross pad used for existing natural or artificial leather to the core.

The real wood sheet 100 includes a real wood sheet body 110 formed to have the same shape as the real wood product. The real wood sheet 100 includes a plurality of wood sheet compression fixing ribs 120 and wrapping fixing ribs 130 formed on the outside of the real wood sheet body 110 in order to fix the real wood sheet 100. The wood sheet compression fixing ribs 120 use a molding (cutting) machine to form a real wood sheet fabric.

Each of the compression fixing ribs 120 has a first fixing hole 121 for fixing the real wood sheet to a press during a preforming process. The first fixing hole 121 is fixed to the fixing pin of the press during the preforming process. The first fixing hole 121 may be further provided with a slit groove 122.

Accordingly, during the preforming, the fixing pin of the preforming press may move along the slit groove 122 in the first fixing hole 121, thereby preventing damage to the real wood body.

As such, when the preforming process is performed on the real wood sheet 100 in a state in which the first fixing hole 121 formed in the compression fixing rib 120 of the real wood sheet 100 is fixed to the fixing pin of the preforming press, the first fixing hole 121 may be opened, thereby preventing damage due to the fixing of the real wood sheet body 110 during the preforming.

Next, during a wood press process, each of the wrapping fixing ribs 130 has a second fixing hole 131 formed by means of the hole processing pin of the preforming press during the preforming in order to fix the real wood sheet to the pin of the press molding machine.

According to the first embodiment of the present disclosure, the real wood sheet 100 includes the real wood sheet body 110 formed to have the same shape as the real wood product by molding (cutting) the real wood sheet 100 fabric, the plurality of wood sheet compression fixing ribs 120 each formed to have a predetermined length by molding (cutting) the real wood sheet 100 fabric on the outside of the real wood sheet body 110 to fix the real wood sheet 100 during the preforming process, and the plurality of wrapping fixing ribs 130 each formed to have a predetermined length by molding (cutting) the real wood sheet 100 fabric on the outside of the real wood sheet body 110 to fix the real wood sheet 100 during the compression process.

Each of the compression fixing ribs 120 has the first fixing hole 121 formed at the specific position thereof by the elongation of the real wood.

Each of the wrapping fixing ribs 130 has the second fixing hole 131 formed by the pin of the press molding machine during the preforming process for inserting the fixing pin of the press molding machine thereinto.

According to the first embodiment of the present disclosure, it is possible to configure a wrapping sheet layer capable of performing the preforming process by fixing the real wood sheet to the preforming press using the compression fixing ribs 120 during the preforming process, and of performing the compression press process by forming the second fixing hole in each wrapping fixing rib required for the next compression process during the preforming process and then fixing the real wood sheet to the compression press which will be performed.

A press apparatus for vehicle crash pads comprising real wood sheets according to the first embodiment of the present disclosure will be described with reference to FIG. 3.

Figure 3:
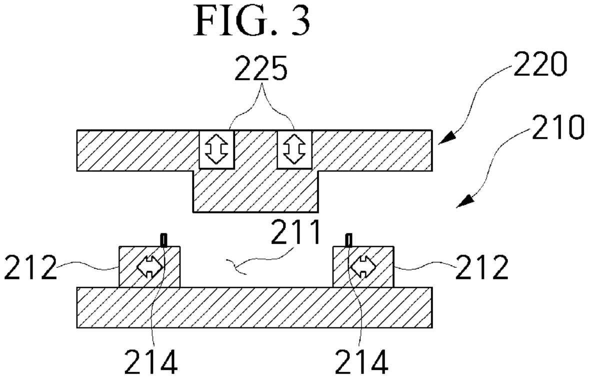
FIGS. 3, 4, 5, 6, and 7 are reference views for explaining a compression process in a press apparatus for vehicle crash pads comprising real wood sheets according to first embodiment of the present disclosure.

FIG. 3 is a view for explaining the press apparatus for vehicle crash pads comprising real wood sheets according to the first embodiment of the present disclosure.

As illustrated in FIG. 3, the press apparatus for vehicle crash pads comprising real wood sheets according to the first embodiment of the present disclosure includes a lower press 210, an upper press 220, a plurality of first slides 212, and a plurality of a second slides 225.

The lower press 210 includes an engraved part 211 provided in an area where a product is to be formed, and support parts 212 configured to support the upper press 220 when compressed to the upper press 220. Each of the support parts 212 has a fixing pin 213 for fixing a real wood sheet 100.

The upper press 220 includes an embossed part 221 corresponding to the engraved part 211 of the lower press 210.

The first slides 212 are moved and fixed to maintain the shape of the engraved part 211 of the lower press 210 during the compression process of the real wood sheet 100, thereby forming the engraved part 211. After the compression process of the real wood sheet 100, the first slides 212 compress the rear surface of the real wood sheet 100 while rising along the embossed part 221 of the upper press 220, and then move laterally.

The second slides 225 are provided in the upper press 220 so that, during the compression process of the real wood sheet 100, they compress the real wood sheet 100 located on the engraved part 211 together with the embossed part 221 of the upper press 220.

After the second slides 225 rise together with the upper press 220 during the wrapping process of the real wood sheet 100, the rear surface of the real wood sheet 100 is compressed by the first slides 212.

Next, the second slides 225 compress the real wood sheet 100 to an inner rear surface of a core 150 while falling such that the real wood sheet 100 bent inward of the engraved part 211 may be wound around the core 150.

As such, according to the first embodiment of the present disclosure, it is possible to automatically produce a real wood product in which the real wood sheet is wrapped around the core after performing the process of compressing the preformed real wood sheet to the core.

A process of the press apparatus for vehicle crash pads comprising real wood sheets according to the first embodiment of the present disclosure will be described with reference to FIGS. 4 to 7.

Figure 4:
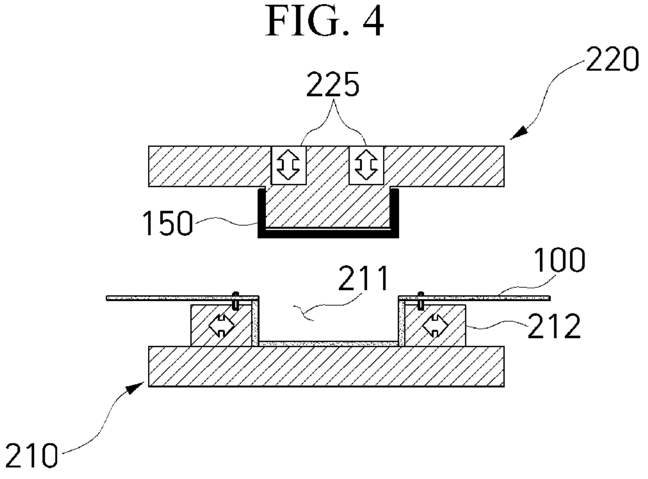

First, as illustrated in FIG. 4, the preformed real wood sheet 100 is seated on the lower press 210, and the core 150 is temporarily bonded to the upper press 220.

Figure 5:
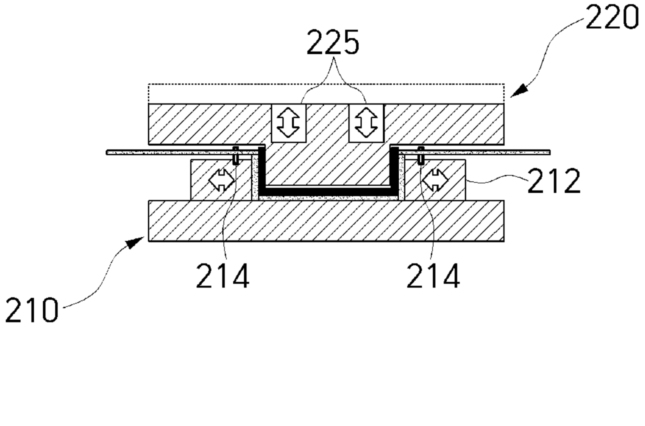

Next, as illustrated in FIG. 5, the upper press 220 is compressed to the lower press 210.

Figure 6:
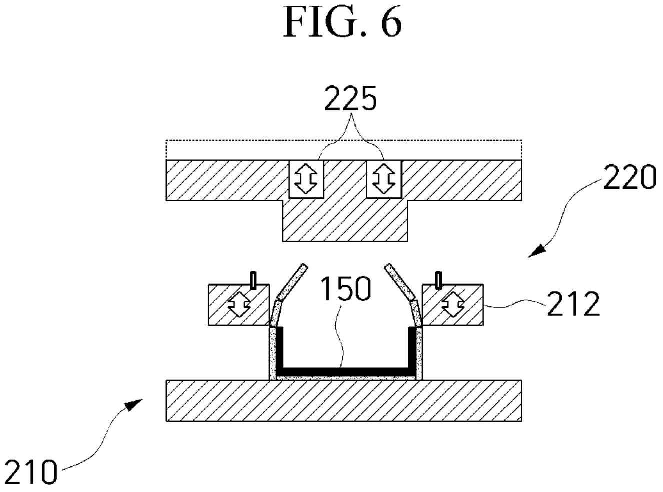

Next, as illustrated in FIG. 6, the upper press 220 is moved up, and the first slides 212 rise along the rear surface of the real wood sheet 100 and move along the side of the real wood sheet.

Figure 7:
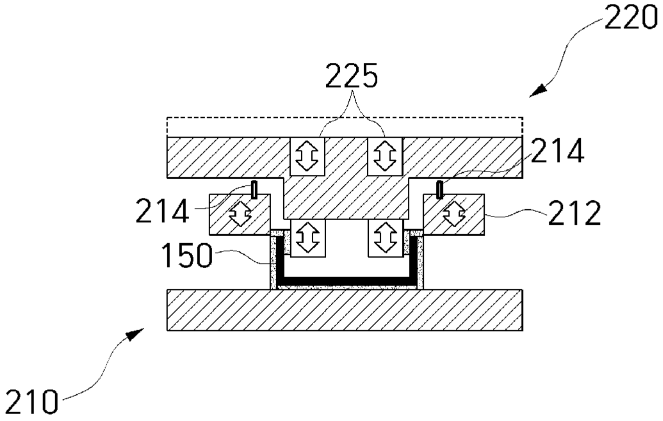

Next, as illustrated in FIG. 7, by lowering the second slides 225 provided in the upper press 220 to compress the real wood sheet 100 located inside the engraved part 211 of the lower press 210, it is possible to automatically perform the wrapping process of the real wood sheet using the slides.

That is, the second slides 225 may compress the real wood sheet 100 to an inner rear surface of a core 150 while falling such that the real wood sheet 100 bent inward of the engraved part 211 may be wound around the core 150.

A press apparatus for vehicle crash pads comprising real wood sheets according to a first embodiment of the present disclosure will be described with reference to FIGS. 8 to 11.

The press apparatus for vehicle crash pads comprising real wood sheets according to the first embodiment of the present disclosure includes a lower press 210, an upper press 220, a plurality of first slides 212, and a plurality of third slides 215.

The lower press 210 includes an engraved part provided in an area where a product is to be formed, and support parts 212 configured to support the upper press 220 when compressed to the upper press 220. Each of the support parts 212 has a fixing protrusion 214 for fixing a real wood sheet 100.

The upper press 220 includes an embossed part 221 corresponding to the engraved part 211 of the lower press 210.

The first slides 212 are fixed to maintain the shape of the engraved part 211 of the lower press 210 during the compression process of the real wood sheet. After the compression process of the real wood sheet, the first slides 212 compress the rear surface of the real wood sheet 100 while rising along the embossed part 221 of the upper press 220, and then move laterally.

The third slides 215 are fixed to maintain the shape of the engraved part 211 of the lower press 210 during the compression process of the real wood sheet. After the compression process of the real wood sheet, the third slides 215 compress the rear surface of the real wood sheet 100 while rising along the embossed part 221 of the upper press 220, and then move to the side of the real wood sheet 100 to cut a portion of the real wood sheet deviating from the core 150.

Figure 8:
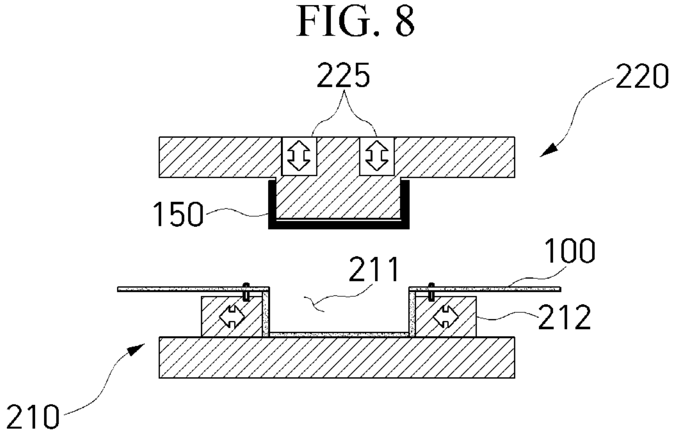
FIGS. 8, 9, 10, and 11 are views for explaining a process of cutting a real wood sheet in a press apparatus for vehicle crash pads comprising real wood sheets according to the first embodiment of the present disclosure.

First, after the preformed real wood sheet 100 is seated on the lower press 210, the core 150 is temporarily bonded to the upper press 220, as illustrated in FIG. 8.

Figure 9:
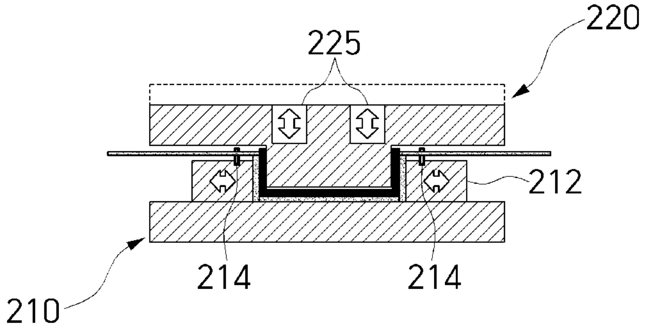

Next, as illustrated in FIG. 9, the upper press 220 is compressed to the lower press 210.

Figure 10:
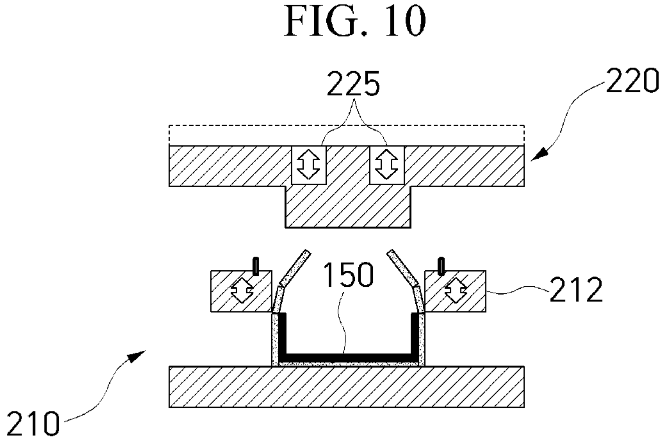

Next, as illustrated in FIG. 10, the upper press 220 is moved up, and the first slides 212 rise along the rear surface of the real wood sheet 100 to press the real wood sheet against the core 150.

Figure 11:
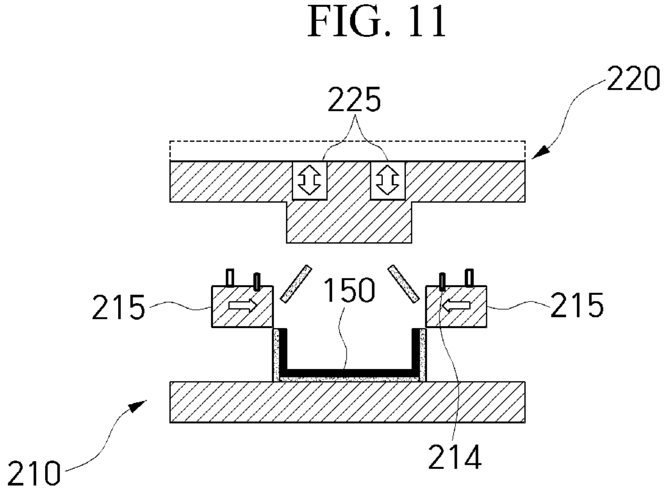

As illustrated in FIG. 11, after the real wood sheet 100 is pressed against the core 150, the third slides 215 cut a portion of the real wood sheet 100 deviating from the core 150 while moving inward.

As such, in the first embodiment of the present disclosure, it is possible to automatically undercut a portion of the compressed real wood sheet deviating from the core.

A press apparatus for vehicle crash pads comprising real wood sheets according to a second embodiment of the present disclosure will be described with reference to FIGS. 12 to 20.

Figure 12:
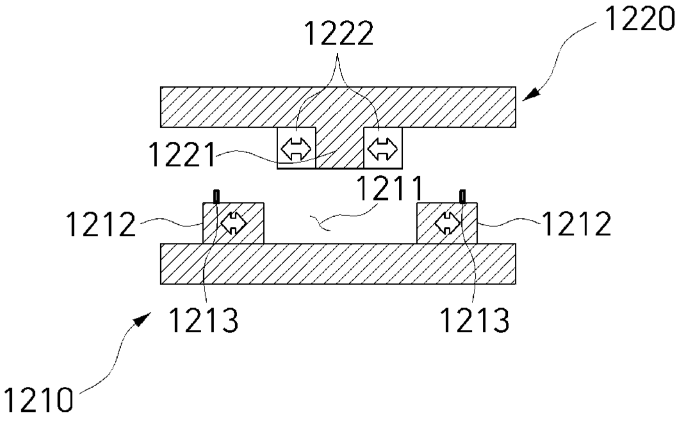
FIGS. 12, 13, 14, 15, 16, 17, 18, 19, and 20 are views for explaining a press apparatus for vehicle crash pads comprising real wood sheets according to a second embodiment of the present disclosure.

FIG. 12 is a view for explaining the press apparatus for vehicle crash pads comprising real wood sheets according to the second embodiment of the present disclosure.

As illustrated in FIG. 12, the press apparatus for vehicle crash pads comprising real wood sheets according to the second embodiment of the present disclosure includes a lower press 1210 and an upper press 1220.

The lower press 1210 includes an engraved part 1211 provided in an area where a product is to be formed, and support parts 1212 configured to support the upper press 1220 when compressed to the upper press 1220. Each of the support parts 1212 has a fixing pin 1213 for fixing a real wood sheet 100.

The upper press 1220 includes an embossed part 1221 corresponding to the engraved part 1211 of the lower press 1210, and first slides 1222 moving in the embossed part 1221 to adjust the width of the embossed part 1221.

The lower press 1210 further includes second slides configured to compress the rear surface of the real wood sheet 100 while rising along a core 150 bonded to the upper press 1220 during the compression process of the real wood sheet 100.

After the compression process of the real wood sheet, the first slides 1222 rise together with the upper press 1220.

Next, during the wrapping process of the real wood sheet, the first slides 1222 compress the inner rear surface of the core 150 while moving downward of the embossed part 1221 of the upper press 1220 such that, after the rear surface of the real wood sheet 100 is compressed by the second slides 1212, the real wood sheet 100 bent inward of the engraved part 1211 may be wound around the core 150.

The lower press 1210 includes the engraved part 1211 provided in the area where the product is to be formed, and the support parts 1212 configured to support the upper press 1220 when compressed to the upper press 1220. Each of the support parts 1212 has the fixing pin 1213 for fixing the real wood sheet 100.

The press apparatus may further include a plurality of third slides 1215 fixed to maintain the shape of the engraved part 1211 of the lower press 1210 during the compression process of the real wood sheet. After the compression process of the real wood sheet, the third slides 1215 compress the rear surface of the real wood sheet 100 while rising along the embossed part 1221 of the upper press 1220, and then move laterally to remove a remaining portion of the real wood sheet.

Figure 22:
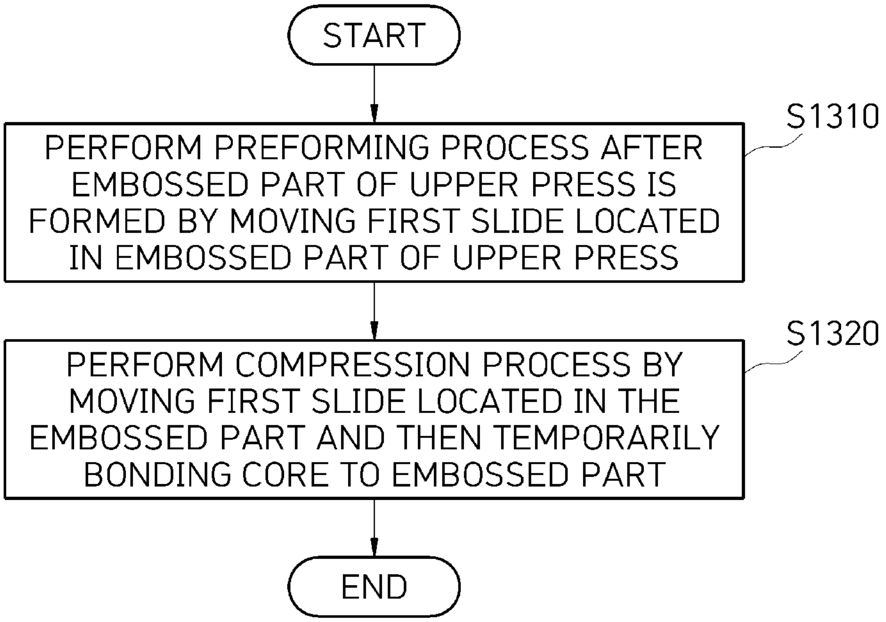
FIG. 22 is a view for explaining a process of cutting a real wood sheet in a press apparatus for vehicle crash pads comprising real wood sheets according to a third embodiment of the present disclosure.

Hereinafter, a method of pressing vehicle crash pads comprising real wood sheets according to a third embodiment of the present disclosure will be described with reference to FIG. 22.

First, a preforming process is performed after an embossed part 1221 of an upper press 1220 is formed by moving first slides 1222 located in the embossed part 1221 of the upper press 1220 so as to correspond to the width of the embossed part 1221 of the upper press 1220 (S1310).

Next, a compression process is performed by moving the first slides 1222 located in the embossed part 1221 such that a core 150 may be attached to the embossed part 1221 of the upper press 1220, and then temporarily bonding the core 150 to the embossed part 1221 (S1320).

Figure 23:
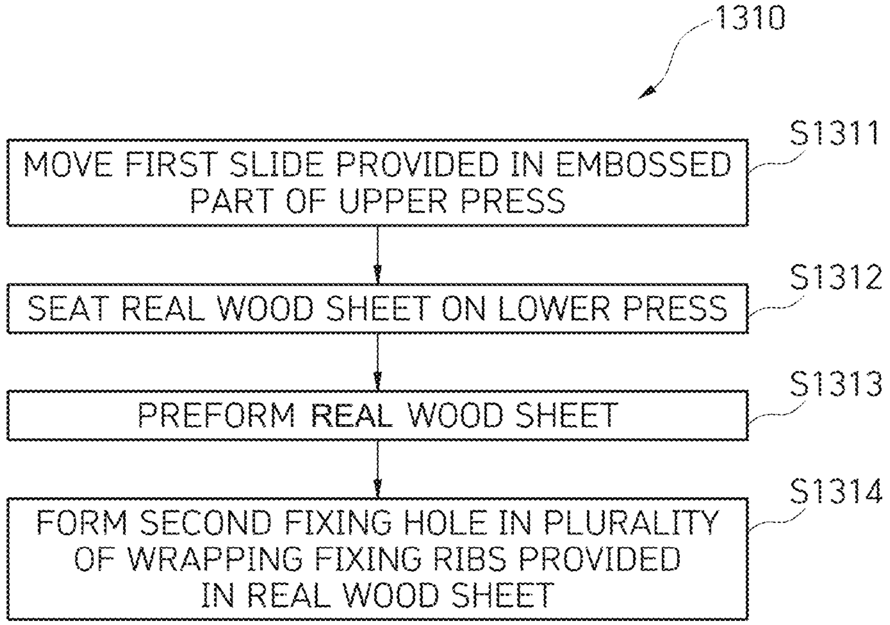
FIG. 23 is a flowchart for explaining a process of wrapping a real wood sheet using a press apparatus for vehicle crash pads comprising real wood sheets according to the third embodiment of the present disclosure.

Hereinafter, the step of performing the preforming process (S1310) will be described with reference to FIG. 23.

First, as illustrated in FIG. 12, the first slides 1222 provided in the embossed part 1221 of the upper press 1220 are moved so as to correspond to the width of an engraved part 1211 of a lower press 1210 (S1311).

Next, fixing pins 1213 provided on second slides 1212 of the lower press 1210 are inserted into first fixing holes formed in compression fixing ribs of a real wood sheet 100 to seat the real wood sheet 100 on the lower press 1210 (S1312).

Figure 13:
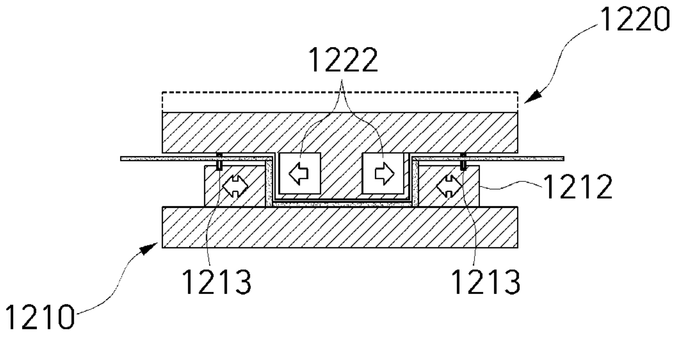

Next, as illustrated in FIG. 13, the real wood sheet 100 is preformed by compressing the upper press 1220 to the lower press 1210 (S1313).

Figure 14:
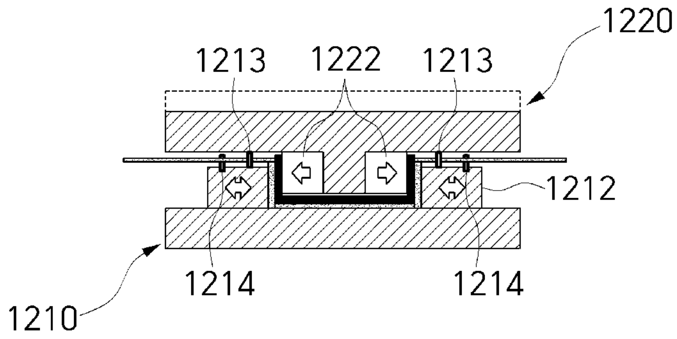

Next, after the real wood sheet 100 is preformed, as illustrated in FIG. 14, second fixing holes are formed in a plurality of wrapping fixing ribs provided in the real wood sheet 100 through processing pins provided in the second slides 1212 (S1314).

Figure 24:
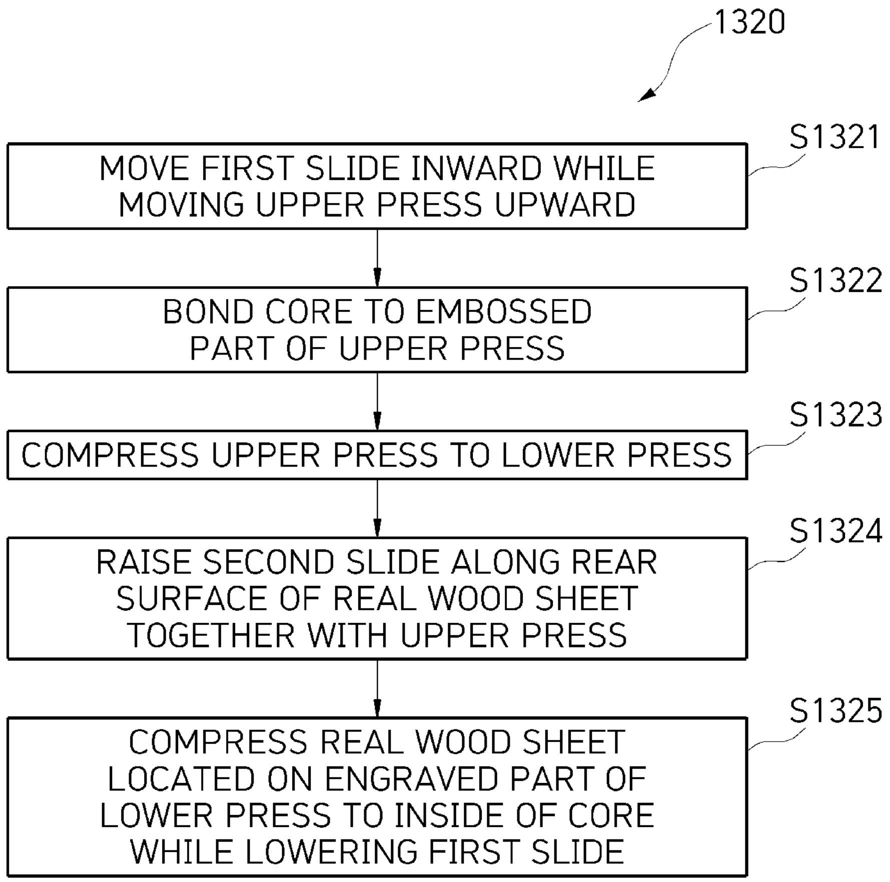
FIG. 24 is a flowchart for explaining a detailed process of the preforming step of FIG. 23.

Hereinafter, a detailed process of the step of performing the compression process (S1320) according to the third embodiment of the present disclosure will be described with reference to FIG. 24.

Figure 15:
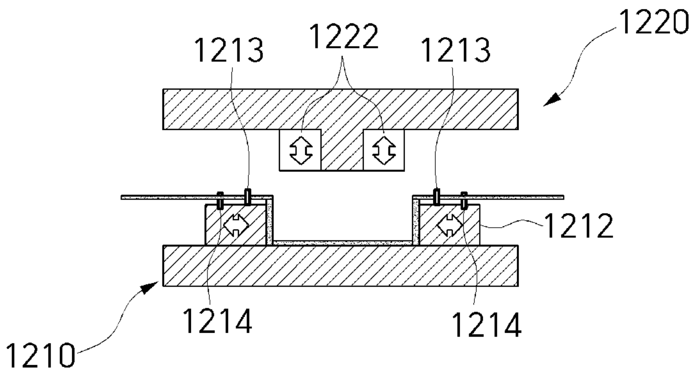

First, as illustrated in FIG. 15, after the preforming process is performed by compressing the real wood sheet 100 through the lower press 1210, the first slides 1222 are moved inward while the upper press 1220 is moved upward (S1321).

Figure 16:
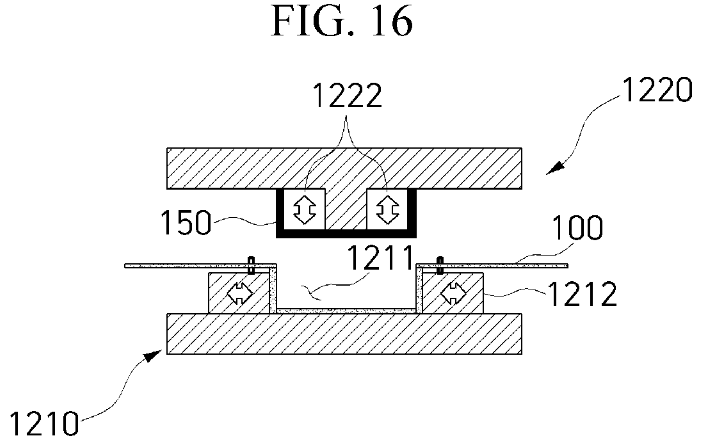

Next, as illustrated in FIG. 16, the core 150 is bonded to the embossed part 1221 of the upper press 1220 (S1322).

Figure 17:
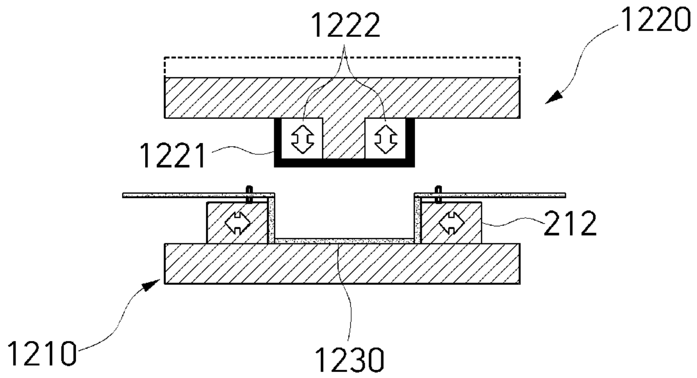
Figure 18:
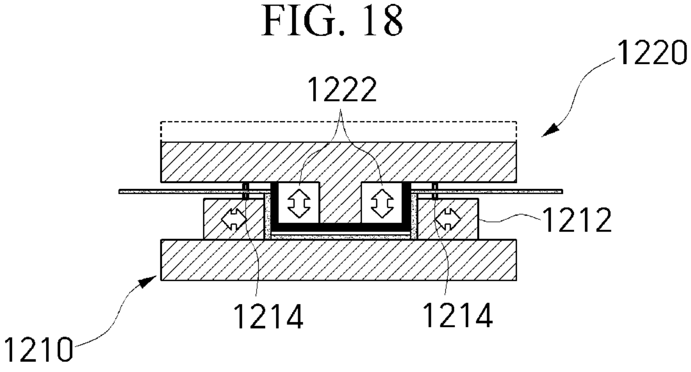

Next, as illustrated in FIG. 17, the upper press 1220 having the core 150 bonded thereto is moved down toward the lower press 1210 having the preformed real wood sheet 100 seated thereon, so that the lower press 1210 is compressed to the upper press 1220 as illustrated in FIG. 18 (S1323).

Figure 19:
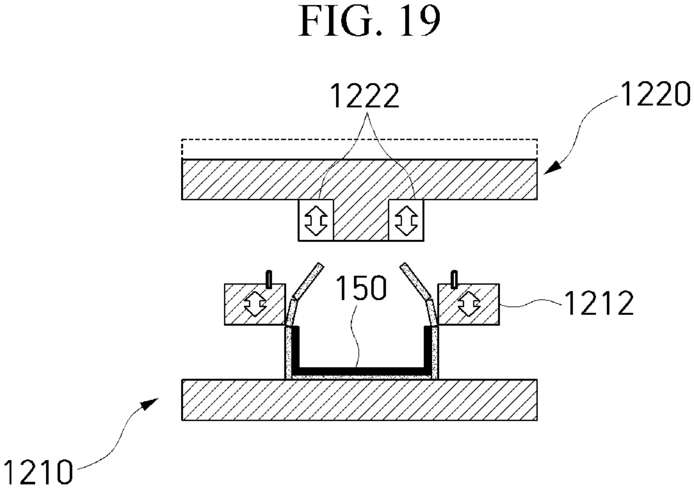

Next, as illustrated in FIG. 19, the second slides 1212 rise along the rear surface of the real wood sheet 100 together with the upper press 1220 (S1324).

Figure 20:
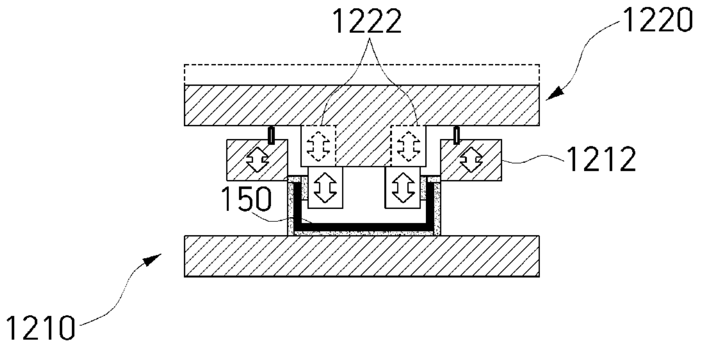

Next, as illustrated in FIG. 20, the real wood sheet 100 located on the engraved part 1211 of the lower press 1210 is compressed to the inside of the core 150 while lowering the first slides 1222 provided in the upper press 1220 (S1325).

Figure 21:
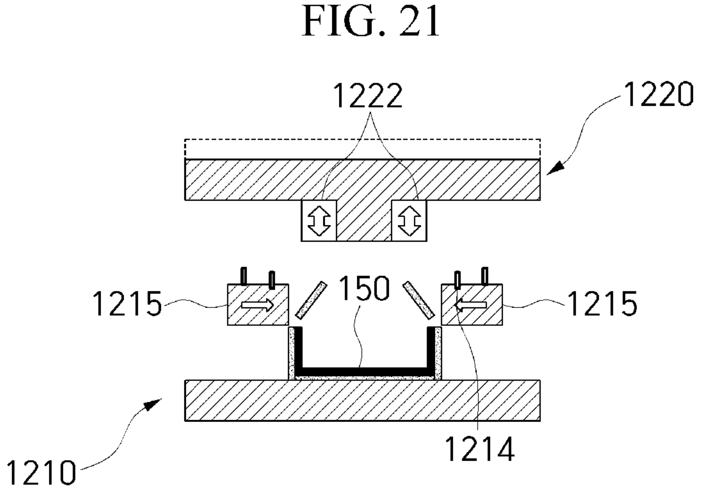
FIG. 21 is a view for explaining an example of cutting in the press apparatus for vehicle crash pads comprising real wood sheets according to the second embodiment of the present disclosure.

During the compression process of the real wood sheet according to the second embodiment of the present disclosure, third slides may be fixed to maintain the shape of the engraved part 1211 of the lower press 1210. After the compression process of the real wood sheet, the third slides may compress the rear surface of the real wood sheet 100 while rising along the embossed part 1221 of the upper press 1220, and then move to the side of the real wood sheet 100 to cut a portion of the real wood sheet 100 deviating from the core 150, as illustrated in FIG. 21.

Hereinafter, the step of performing the preforming process (S1310) will be described with reference to FIG. 23.

First, as illustrated in FIG. 12, the first slides 1222 provided in the embossed part 1221 of the upper press 1220 are moved so as to correspond to the width of an engraved part 1211 of the lower press 1210 (S1311).

Next, fixing pins 1213 provided on second slides 1212 of the lower press 1210 are inserted into first fixing holes formed in compression fixing ribs of a real wood sheet 100 to seat the real wood sheet 100 on the lower press 1210 (S1312).

Next, as illustrated in FIG. 13, the real wood sheet 100 is preformed by compressing the upper press 1220 to the lower press 1210 (S1313).

Next, after the real wood sheet 100 is preformed, as illustrated in FIG. 14, second fixing holes are formed in a plurality of wrapping fixing ribs provided in the real wood sheet 100 through processing pins provided in the second slides 1212 (S1314).

Hereinafter, a detailed process of the step of performing the compression process (S1320) according to the third embodiment of the present disclosure will be described with reference to FIG. 24.

First, as illustrated in FIG. 15, after the preforming process is performed by compressing the real wood sheet 100 through the lower press 1210, the first slides 1222 are moved inward while the upper press 1220 is moved upward (S1321).

Next, as illustrated in FIG. 16, the core 150 is bonded to the embossed part 1221 of the upper press 1220 (S1322).

Next, as illustrated in FIG. 17, the upper press 1220 having the core 150 bonded thereto is moved down toward the lower press 1210 having the preformed real wood sheet 100 seated thereon, so that the lower press 1210 is compressed to the upper press 1220 as illustrated in FIG. 18 (S1323).

Next, as illustrated in FIG. 19, the second slides 1212 rise along the rear surface of the real wood sheet 100 together with the upper press 1220 (S1324).

Next, as illustrated in FIG. 20, the real wood sheet 100 located on the engraved part 1211 of the lower press 1210 is compressed to the inside of the core 150 while lowering the first slides 1222 provided in the upper press 1220 (S1325).

During the compression process of the real wood sheet according to the third embodiment of the present disclosure, third slides may be fixed to maintain the shape of the engraved part 1211 of the lower press 1210. After the compression process of the real wood sheet, the third slides may compress the rear surface of the real wood sheet 100 while rising along the embossed part 1221 of the upper press 1220, and then move to the side of the real wood sheet 100 to cut a portion of the real wood sheet 100 deviating from the core 150, as illustrated in FIG. 21.

Figure 25:
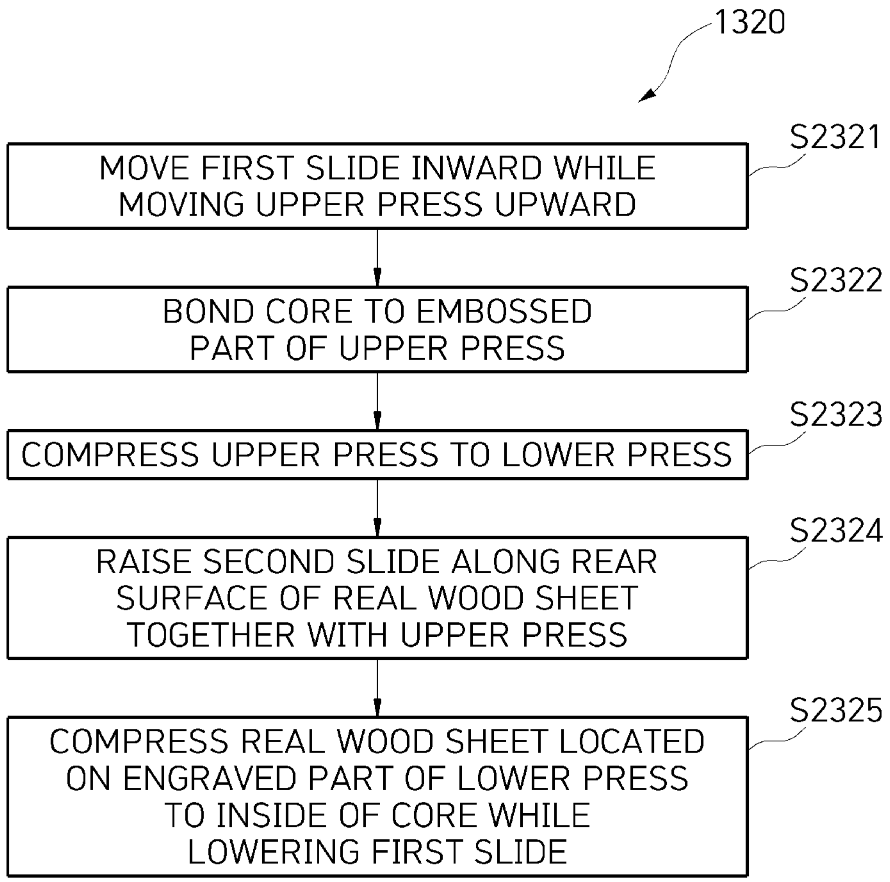
FIG. 25 is a flowchart for explaining a detailed process of the compression step of FIG. 23.

Hereinafter, a method of pressing vehicle crash pads comprising real wood sheets according to a yet third embodiment of the present disclosure will be described with reference to FIG. 25.

First, a preformed real wood sheet is seated on a lower press (S2321).

After a core is bonded to an upper press, the upper press is compressed to the lower press (S2322).

A first slide rises along the rear surface of the real wood sheet together with the upper press (S2323).

Next, the first slide is fixed to maintain a shape of an engraved part of the lower press during the compression process of the real wood sheet, and after the compression process of the real wood sheet, compresses the rear surface of the real wood sheet while rising along an embossed part of the upper press (S2324).

Next, a third slide is moved to the side of the real wood sheet to cut a portion of the real wood sheet deviating from the core (S2325).

As is apparent from the above description, according to the third embodiment of the present disclosure, it is possible to use the side slide core for implementation of undercuts, to improve adhesion, and to use the rear slide core for implementation of automatic wrapping and thus process automation.

In addition, according to the third embodiment of the present disclosure, it is possible to make the real wood sheet, constituting the vehicle desk, visually feel the same as real wood, and to provide a certain degree of cushioning when the real wood sheet is touched by an occupant.

Each step included in the method described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Although the present disclosure has been described in detail with respect to the embodiments illustrated in the accompanying drawings, such embodiments are provided by way of example only. It will be understood by those skilled in the art that various modifications and variations may be made without departing from the spirit and scope of the disclosure as defined in the following claims. Therefore, the scope of protection of the present disclosure should not be limited to the above-mentioned embodiments and should be defined by the disclosure as defined in the appended claims.

What is claimed is:

1. A press apparatus for vehicle crash pads comprising real wood sheets, the press apparatus comprising:
- a lower press comprising an engraved part disposed in an area in which a product is to be formed;
- an upper press comprising an embossed part corresponding to the engraved part of the lower press;
- a support part disposed on the lower press and configured to support the upper press when compressed towards the lower press;
- a fixing protrusion extending from the support part and configured to fix a real wood sheet; and
- one or more first slides disposed along a boundary of the engraved part of the lower press during a compression of the real wood sheet, the one or more first slides configured to:
  - travel longitudinally along the embossed part of the upper press and move laterally after travelling longitudinally towards the upper press; and
  - compress a rear surface of the real wood sheet after the upper press moves away from the lower press; and
- one or more second slides disposed in the upper press and configured to:
  - compress the real wood sheet located on the engraved part together with the embossed part of the upper press; and
  - bend an end of the real wood sheet inwards towards an inner rear surface of a core while moving down from the upper press towards the lower press,
- wherein the rear surface of the real wood includes a surface of the real wood distal from the embossed part, and
- wherein the support part further comprises a fixing pin for fixing the real wood sheet.

2. The press apparatus according to claim 1, wherein the one or more first slides are further configured to selectively move to maintain the shape of the engraved part of the lower press during the compression of the real wood sheet.

3. The press apparatus according to claim 2,
- wherein the one or more first slides are further configured to compress the rear surface of the real wood sheet to the core while rising along the embossed part of the upper press, and then to move laterally; and
- wherein the one or more second slides are further configured to compress the real wood sheet located on the engraved part together with the embossed part of the upper press during the compression of the real wood sheet.

4. The press apparatus according to claim 3,
- wherein the one or more first slides are further configured to compress the rear surface of the real wood sheet after the second slide rises together with the upper press; and
- wherein the one or more second slides are further configured to bend the end of the real wood sheet inward to be wound around the core.

5. The press apparatus according to claim 1, further comprising:
- one or more third slides fixed to maintain the shape of the engraved part of the lower press during the compression of the real wood sheet,
- wherein the one or more third slides are configured to:
  - compress the rear surface of the real wood sheet while rising along the embossed part of the upper press; and
  - move laterally to cut off a portion of the real wood sheet.

6. The press apparatus according to claim 1, wherein the real wood sheet comprises:

a real wood sheet body formed to have a shape of a real wood product;

one or more compression fixing ribs formed on the outside of the real wood sheet body to fix the real wood sheet;

wood sheet compression fixing ribs having a first fixing hole for fixing the real wood sheet to a press; and a wrapping fixing rib formed on the outside of the real wood sheet body to fix the real wood sheet, the wrapping fixing rib having a second fixing hole formed by a hole processing pin of a preforming press to fix the real wood sheet to the fixing pin of the press apparatus.

7. A press apparatus for vehicle crash pads comprising real wood sheets, the press apparatus comprising:

a lower press comprising an engraved part disposed in an area in which a product is to be formed;

an upper press comprising an embossed part corresponding to the engraved part of the lower press;

a support part disposed on the lower press, the support part configured to support the upper press when compressed towards the upper press;

a fixing protrusion extending from the support part and being configured to fix a real wood sheet;

one or more first slides fixed on the lower press to maintain a shape of the engraved part of the lower press during compression of the real wood sheet, the one or more first slides configured to compress a rear surface of the real wood sheet while rising along the embossed part of the upper press and then to move laterally; and one or more second slides disposed in the upper press, the one or more second slides configured to:

compress the real wood sheet located on the engraved part together with the embossed part of the upper press; and move to a side of the embossed part to cut a portion of the real wood sheet deviating from a core, wherein the support part further comprises a fixing pin for fixing the real wood sheet.

* * * * *